United States Patent [19]
Grantham

[11] Patent Number: 5,720,325
[45] Date of Patent: Feb. 24, 1998

[54] COAXIAL HOSE ASSEMBLY FOR VAPOR ASSIST FUEL DISPENSING SYSTEM

[75] Inventor: Rodger P. Grantham, Springfield, Mo.

[73] Assignee: Gilbarco, Inc., Greensboro, N.C.

[21] Appl. No.: 594,369

[22] Filed: Jan. 30, 1996

Related U.S. Application Data

[63] Continuation of Ser. No. 344,553, Nov. 23, 1994, abandoned.

[51] Int. Cl.⁶ .................................................. B65B 31/00
[52] U.S. Cl. .......................... 141/59; 141/46; 141/392; 138/113; 138/114; 285/133.1
[58] Field of Search ................................ 141/207, 208, 141/44, 46, 59, 206, 301, 306, 347, 392; 137/588, 798, 614; 285/133.1, 135; 138/113, 114

[56] References Cited

U.S. PATENT DOCUMENTS

| | | | |
|---|---|---|---|
| 3,171,448 | 3/1965 | Fromm | 141/293 |
| 5,141,037 | 8/1992 | Carmack | 141/206 |
| 5,297,574 | 3/1994 | Healy | 137/68.1 |
| 5,297,595 | 3/1994 | Haile et al. | 141/59 |
| 5,341,855 | 8/1994 | Rabinovich | 141/59 |
| 5,345,979 | 9/1994 | Tucker et al. | 141/1 |
| 5,365,973 | 11/1994 | Fink, Jr. et al. | 137/614 |
| 5,377,729 | 1/1995 | Reep | 141/392 |

*Primary Examiner*—Henry J. Recla
*Assistant Examiner*—Timothy L. Maust
*Attorney, Agent, or Firm*—Antonelli, Terry, Stout & Kraus, LLP

[57] ABSTRACT

Coaxial inner and outer flexible hoses connect with corresponding concentric tubular coupling members and define an inner vapor return passage and a surrounding annular fuel supply passage. The hoses and coupling members extend between a vapor recovery fuel dispensing pump and a vapor assist fuel dispensing nozzle. The tubular inner coupling member is formed in two threadably connected tubular sections which define an annular valve seat surrounding the vapor return passage. A poppet-type check valve member is supported within the vapor return passage down stream of the valve seat for axial movement from a normally open and unrestricting retracted position to a closed position engaging the valve seat in response to pressurized fuel entering the vapor return passage.

37 Claims, 1 Drawing Sheet

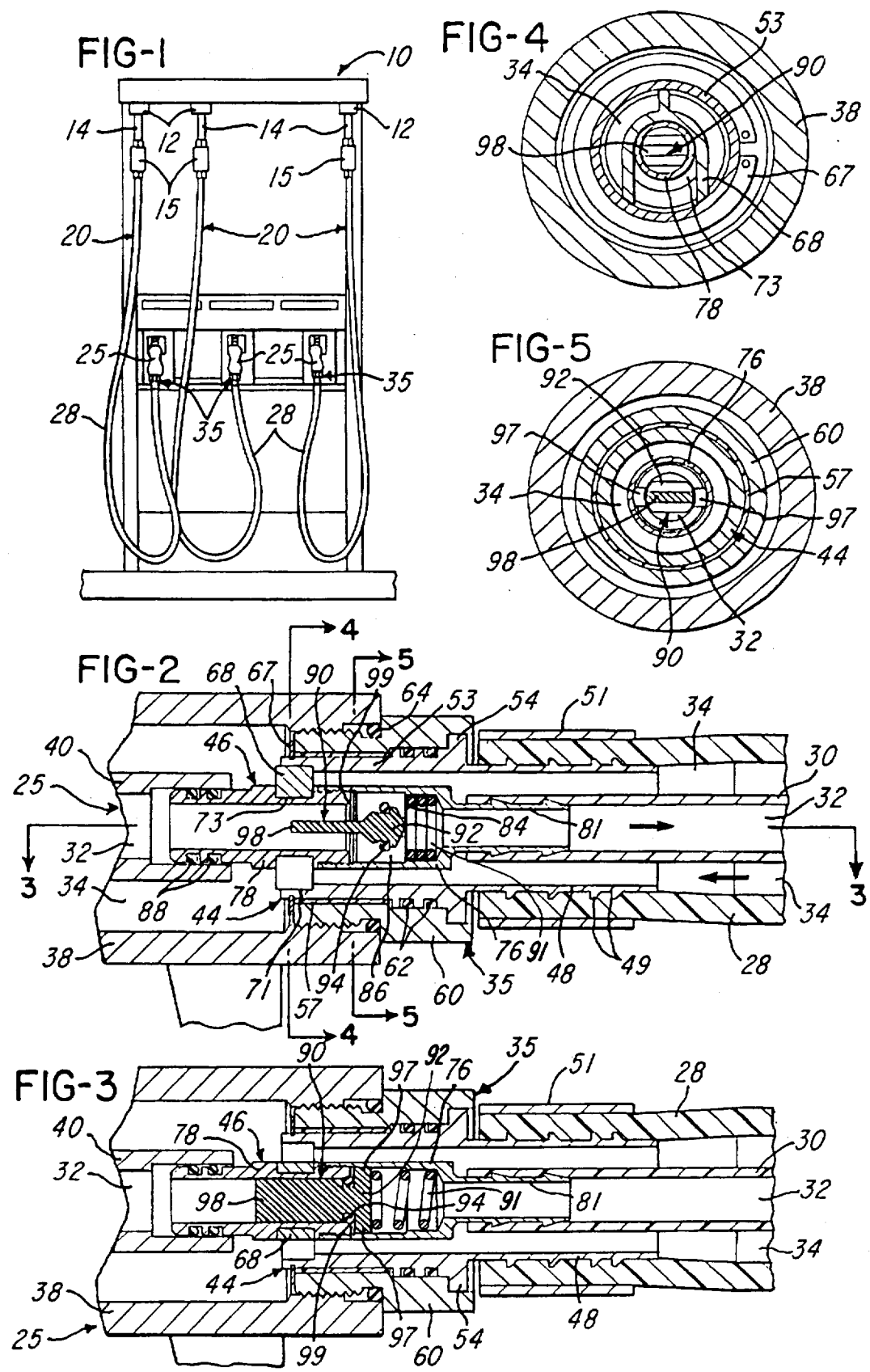

COAXIAL HOSE ASSEMBLY FOR VAPOR ASSIST FUEL DISPENSING SYSTEM

This application is a Continuation of application Ser. No. 08/344,553, filed Nov. 23, 1994, now abandoned.

BACKGROUND OF THE INVENTION

In a vapor recovery fuel dispensing system of the vapor assist type, such as disclosed, for example, in U.S. Pat. No. 5,345,979, a coaxial hose assembly is used to conduct fuel from a vapor return fuel dispensing pump to a vapor return fuel dispensing nozzle. The hose assembly includes a flexible inner hose which defines a vapor return passage connected to a suction unit within the dispensing pump. A larger flexible outer hose surrounds the inner hose and defines an annular fuel supply passage between the coaxial hoses. The inner ends of the coaxial hoses are usually connected by a coaxial breakaway coupling to the dispensing pump, for example, by a coupling as disclosed in U.S. Pat. No. 5,297,574. The outer ends of the coaxial hoses are connected by concentric tubular coupling fittings or members to a vapor recovery fuel dispensing nozzle, and the coupling members provide for rotation of the dispensing nozzle relative to the coaxial hose assembly.

In an inverted or vapor assist type vapor recovery fuel dispensing system as described above, a leak path sometimes develops between the inner and outer flexible hoses. As a result, the higher pressure liquid fuel seeps from the pressurized fuel supply passage into the inner vapor return passage which has a light suction. The fuel will then flow outwardly through the vapor return passage within the inner hose and the dispensing nozzle and be discharged from the nozzle onto the ground or surface surrounding the nozzle. Liquid fuel can also enter the vapor return passage as a result of hydraulic action caused by the hose construction or dispensing pump components or from a drive-off and breakaway situation. Any fuel within the vapor return passage is free to flow outwardly through the vapor return passage and be discharged from the fuel dispensing nozzle.

SUMMARY OF THE INVENTION

The present invention is primarily directed to an improved coaxial hose assembly for a vapor assist fuel dispensing system wherein an inner flexible hose defines a vapor return passage extending from a dispensing nozzle to a dispensing pump. The hose assembly of the invention prevents any liquid fuel which inadvertently enters the vapor return passage from being discharged from the dispensing nozzle through the vapor return passage.

In accordance with a preferred embodiment of the invention, a coaxial hose assembly defines an inner vapor return passage and a surrounding annular fuel supply passage. The passages extend through inner and outer tubular coupling members which connect the coaxial hoses to a vapor return fuel dispensing nozzle and provide for relative rotation between the nozzle and the coaxial hoses. The inner coupling member is formed by two threadably connected tubular sections which form an extension of the vapor return passage. The upstream section defines an annular valve seat and supports a flat blade portion of a poppet-type check valve member having a head portion within the downstream section. A resilient O-ring is carried by the head portion for engaging the valve seat, and the head portion includes outwardly projecting ears which engage an annular shoulder within the upstream section to position the valve member in an open position where the valve member does not produce any significant restriction to vapor flow.

In normal operation when fuel is flowing to the dispensing nozzle through the annular outer passage, and vapor is returning to the dispensing pump through the inner vapor passage, the valve member is held against the annular shoulder by the suction within the vapor passage. In the event pressurized fuel within the fuel passage seeps into or otherwise enters the vapor return passage within the coaxial hose assembly, the fuel shifts the check valve member to its closed position so that any fuel is prevented from flowing outwardly through the vapor return passage and being discharged through the nozzle spout.

Other features and advantages of the invention will be apparent from the following description, the accompanying drawing and the appended claims.

BRIEF DESCRIPTION OF THE DRAWINGS

FIG. 1 is an elevational view of a coaxial hose assembly constructed in accordance with the invention and illustrating the hose assembly installed between a vapor recovery fuel dispensing pump and a vapor recovery fuel dispensing nozzle;

FIG. 2 is an axial section through a portion of the coaxial hose assembly shown in FIG. 1 and showing the assembly coupled to a dispensing nozzle during normal use of the nozzle;

FIG. 3 is an axial section taken generally on the line 3—3 of FIG. 2 and showing the hose assembly after fuel has entered the vapor return passage;

FIG. 4 is a section taken generally on the line 4—4 of FIG. 2; and

FIG. 5 is a section taken generally on the line 5—5 of FIG. 2.

DESCRIPTION OF THE PREFERRED EMBODIMENT

FIG. 1 illustrates a vapor return fuel dispensing pump 10 for dispensing three different grades or octanes of fuel through outlet fittings 12 projecting downwardly from the top portion of the pump 10. Each of the fittings 12 is connected by a short flexible coaxial hose 14 to a coaxial breakaway coupling 15, and a long flexible coaxial hose assembly 20 extends from each coupling 15 to a corresponding vapor recovery or vapor assist fuel dispensing nozzle 25 which is normally stored within a corresponding recess within the dispensing pump 10.

The coaxial hose assembly 20 includes an outer flexible hose 28 (FIGS. 1 & 2) extruded of a plastics or rubber material and surrounding a flexible inner hose 30 also extruded of a flexible plastics or rubber material. The inner hose 30 defines therein a vapor return passage 32, and the outer hose 28 and inner hose 30 define therebetween an annular fuel supply passage 34. The coaxial hose assembly 20 also includes a coaxial coupling 35 which is constructed in accordance with the present invention. The coupling 35 connects the tubes 28 and 30 to corresponding tubular portions 38 and 40 of the vapor assist fuel dispensing nozzle 25 and which form extensions of the vapor return passage 32 and fuel supply passage 34 within the nozzle.

In accordance with the present invention, the coaxial coupling 35 includes a tubular outer coupling member 44 and a tubular inner coupling member 46 which also define extensions of the inner vapor return passage 32 and the annular outer fuel supply passage 34. The outer coupling member 44 includes a tubular portion 48 which projects into the adjacent end portion of the outer hose 28 and has axially spaced circumferential ribs 49 which grip the outer hose 28. A clamping band 51 tightly surrounds the end portion of the hose 28 to secure the hose to the coupling portion 48.

The outer coupling member 44 also includes an opposite end portion 53 having an outwardly projecting flange 54 and surrounded by a low friction plastic sleeve 57 for rotatably supporting a tubular nut 60. The nut 60 provides for relative rotation between the nozzle 25 and the hose assembly 20, and a set of resilient O-rings 62 form a fluid-tight rotary seal between the nut 60 and the outer coupling member 44. Another resilient O-ring 64 is carried by the nut 60 and forms a fluid-tight seal between the nut 60 and the nozzle 25 when the nut is threaded into the nozzle portion 38. A spring type C-shaped retaining ring 67 seats within the outer end portion of the outer coupling member 44 and retains the nut 60 on the outer coupling member adjacent the flange 54. The enlarged end portion of the nut 60 has a hex-shaped outer surface for receiving a wrench.

Referring to FIG. 4, a retaining member 68 has the shape of a tuning fork and is formed by a section of an aluminum extrusion. As shown in FIG. 2, the outer surfaces of the three legs of the retaining member 68 are machined to seat within a counterbore 71 formed within the end of the outer coupling member 44. The parallel legs of the retaining member 68 extend within a circumferential groove 73 formed within the inner coupling member 46. The retaining member 68 locates the inner coupling member 46 axially and radially within the outer coupling member 44.

As shown in FIGS. 2 and 3, the inner coupling member 46 includes a tubular downstream section 76 which is threadably connected to a tubular upstream section 78. The section 76 includes a reduced portion 81 which projects into the end portion of the vapor return hose 30 and has axially spaced circumferential ribs for gripping the inner hose 30. The inner coupling section 76 also has an internal annular shoulder or step 84 at one end of an enlarged cylindrical valve chamber 86. The coupling section 78 is provided with the circumferential groove 73 for receiving the retaining member 68 and also carries a pair of resilient O-rings 88 to form a fluid-tight rotary seal between the inner coupling member 46 and the tubular nozzle portion 40.

A poppet-type check valve includes a valve member 90 supported for axial movement within the inner coupling member 46 and includes a head portion 92 which has a cylindrical surface for supporting a resilient O-ring 94. The head portion 92 also includes a pair of diametrically opposite ears 97 (FIGS. 3 & 5) which project radially outwardly for slidably engaging the inner surface of the coupling section 76 defining the chamber 86. The valve member 90 also includes a generally flat blade portion 98 which projects upstream from the head portion 92 within the vapor passage 32 and slidably engages the inner cylindrical surface of the coupling section 78. The valve member 90 is free to shift between an open position (FIG. 2), when the ears 97 engage the shoulder 84, and a closed position (FIG. 3) when the O-ring 94 engages an annular valve seat 99 formed on the end of the coupling section 78.

In operation of the hose assembly 20, when the nozzle 25 is dispensing fuel which is flowing from right to left in FIGS. 2 & 3 through the annular fuel supply passage 34, the pressure of the liquid fuel is usually within a range of 18 to 35 psi. While the fuel is being dispensed, a light section is produced within the vapor return passage 32 from a vacuum pump located within the dispenser pump 10 in order to suck the fuel vapors back through the vapor return passage 32 into the dispensing pump 10. The low suction or vacuum is usually on the order of 8 inches of water. This light suction is sufficient to hold the valve member 90 in its retracted open position (FIG. 2) within the chamber 86 where the valve member presents no restriction to the free flow of vapor through the return passage 32.

In the event that the pressurized liquid fuel leaks from the fuel supply passage 34 into the vapor return passage 32, for example, between an end portion of the inner hose 30 and a fitting which receives the end portion or due to a mechanically generated pressure pulse within the fuel supply system, the pressurized fuel within the vapor return passage 32 immediately shifts the valve member 90 from its open position (FIG. 2) to its closed position (FIG. 3). As a result, no fuel is discharged outwardly through the vapor return passage 32 within the dispensing nozzle 25. While a light compression spring 91 may be located within the tubular coupling section 76 for normally urging the valve member 90 to its closed position, this spring must exert a low force so that the suction within the vapor return passage 32 is sufficient to compress the spring and move the valve member 90 to its open position.

From the drawing and the above description, it is apparent that a coaxial hose assembly constructed in accordance with the present invention, provides desirable features and advantages. As a primary advantage, the poppet or check valve within the inner tubular coupling member 46, effectively prevents any liquid fuel from being discharged through the vapor return passage 32 within the dispensing nozzle 25 in the event the pressurized fuel enters the vapor return passage 32 within the inner hose 30. The valve member 90 and the section 76 are also constructed so that they produce no significant restriction to the flow of fuel within the passage 34 or the flow of return vapor through the passage 32 when the valve member is in its open position, as shown in FIG. 2. The poppet or check valve assembly is also simple and economical in construction and cooperates to provide for relative rotation between the hose assembly 20 and dispensing nozzle 25.

While the form of hose assembly herein described constitutes a preferred embodiment of the invention, it is to be understood that the invention is not limited to this precise assembly and that changes may be made therein without departing from the scope and spirit of the invention as defined in the appended claims.

The invention having thus been described, the following is claimed:

1. A coaxial hose assembly for connecting a vapor return fuel dispensing nozzle to a vapor return fuel dispensing pump, comprising an elongated flexible inner hose having opposite end portions and defining a vapor return passage for directing vapor from the nozzle to the pump, an elongated outer flexible hose surrounding said inner hose and having corresponding opposite end portions, said inner and outer hoses defining therebetween a longitudinally extending annular fuel passage for directing a liquid fuel supply from the pump to the nozzle, a tubular inner coupling member for connecting one of said end portions of said inner hose to the nozzle and forming an extension of said vapor return passage, a tubular outer coupling member surrounding said inner coupling member for connecting a corresponding said end portion of said outer hose to the nozzle, said tubular inner and outer coupling members defining therebetween a fuel passage connected to form an extension of said fuel passage defined between said hoses, said inner coupling member including means forming an annular valve seat surrounding said vapor return passage, a check valve member positioned within said inner coupling downstream of said valve seat with respect to the vapor flow, means supporting said check valve member for axial movement between a closed position engaging said valve seat and an open position spaced downstream from said valve seat, said check valve member being normally in said open position in response to suction within said vapor return passage to provide for the return flow of vapor, and said check valve member being in said closed position in response to higher pressure liquid fuel entering said vapor return passage within said inner hose to prevent the discharge of fuel outwardly through said vapor return passage and the nozzle.

2. A hose assembly as defined in claim 1 wherein said inner coupling member comprises a first tubular section and a second tubular section, means for securing said first and second tubular sections, and said check valve member is confined between said sections.

3. A hose assembly as defined in claim 2 wherein said check valve member comprises a head portion connected to a blade portion, said blade portion slidably engages said first tubular section to support said check valve member for said axial movement, and a resilient ring mounted on said head portion for engaging said seat.

4. A hose assembly as defined in claim 3 wherein said head portion includes outwardly projection ears, and said second tubular section includes an internal annular shoulder forming a stop for said ears when said valve member is in said open position.

5. A hose assembly as defined in claim 2 wherein said means for securing said first and second tubular sections comprise threaded portions of said sections.

6. A coaxial hose assembly for connecting a vapor return fuel dispensing nozzle to a vapor return fuel dispensing pump, comprising an elongated flexible inner hose having opposite end portions, an elongated outer flexible hose surrounding said inner hose and having corresponding opposite end portions, said inner and outer hoses defining a fuel passage for directing a liquid fuel supply from the pump to the nozzle and a vapor return passage for directing vapor from the nozzle to the pump, a tubular inner coupling member for connecting one of said end portions of said inner hose to the nozzle and a tubular outer coupling member surrounding said inner coupling member for connecting a corresponding said end portion of said outer hose to the nozzle, said tubular inner and outer coupling members defining a fuel passage and a vapor return passage forming extensions of said fuel and vapor return passages within said hoses, means forming an annular valve seat surrounding said vapor return passage, a check valve member positioned within said vapor return passage downstream of said valve seat with respect to the vapor flow, means supporting said check valve member for axial movement between a closed position engaging said valve seat and an open position spaced downstream from said valve seat, said check valve member being normally in said open position in response to suction within said vapor return passage to provide for the return flow of vapor, and said check valve member being in said closed position in response to higher pressure liquid fuel entering said vapor return passage to prevent the discharge of fuel outwardly through said vapor return passage and the nozzle.

7. A hose assembly as defined in claim 6 wherein said inner coupling member comprises a first tubular section and a second tubular section, means for securing said first and second tubular sections, and said check valve member is confined between said sections.

8. A hose assembly as defined in claim 7 wherein said check valve member comprises a head portion connected to a blade portion, said blade portion slidably engages said first tubular section to support said check valve member for said axial movement, and a resilient ring mounted on said head portion for engaging said seat.

9. A hose assembly as defined in claim 8 wherein said head portion includes outwardly projection ears, and said second tubular section includes an internal annular shoulder forming a stop for said ears when said valve member is in said open position.

10. A hose assembly as defined in claim 7 wherein said means for securing said first and second tubular sections comprise threaded portions of said sections.

11. A coaxial hose assembly for connecting a vapor return fuel dispensing nozzle to a vapor return fuel dispensing pump, comprising an elongated flexible inner hose having opposite end portions and defining a vapor return passage for directing vapor from the nozzle to the pump, an elongated outer flexible hose surrounding said inner hose and having corresponding opposite end portions, said inner and outer hoses defining therebetween a longitudinally extending annular fuel passage for directing a liquid fuel supply from the pump to the nozzle, a tubular inner coupling member for connecting one of said end portions of said inner hose to the nozzle and forming an extension of said vapor return passage, a tubular outer coupling member surrounding said inner coupling member for connecting a corresponding said end portion of said outer hose to the nozzle, said tubular inner and outer coupling members defining therebetween a fuel passage connected to form an extension of said fuel passage defined between said hoses, said inner coupling member including a first tubular section forming an annular valve seat surrounding said vapor return passage, a second tubular section connected to said first tubular section, a check valve member positioned within said second tubular section downstream of said valve seat with respect to the vapor flow, said first tubular section supporting said check valve member for axial movement between a closed position engaging said valve seat and an open position spaced downstream from said valve seat, said check valve member being normally in said open position in response to suction within said vapor return passage to provide for the return flow of vapor, and said check valve member being in said closed position in response to higher pressure liquid fuel entering said vapor return passage within said inner hose to prevent the discharge of fuel outwardly through said vapor return passage and the nozzle.

12. An assembly comprising:
   a vapor return passage;
   a fuel passage, coaxial with the vapor return passage, for directing liquid through the fuel passage; and
   a valve mechanism disposed within the vapor return passage having an open position and a closed position, the valve mechanism being normally in the open position in response to suction within the vapor return passage causing a return flow of vapor through the vapor return passage, and being in the closed position in response to liquid fuel which leaks into the vapor return passage downstream of the valve mechanism, with reference to the return flow of vapor through the vapor return passage, and contacts a portion of the valve mechanism whereby leakage of fuel from the vapor return passage is prevented.

13. An assembly in accordance with claim 12 wherein the valve mechanism comprises:
   a tubular passage to which suction is applied;
   a movable valve element which is positionable in the open and closed positions and movable therebetween;

a first shoulder located on an inner surface of the tubular passage which functions as a valve seat for the movable valve element when positioned in the closed position to form a fluid tight seal between the first shoulder and the movable valve element.

14. An assembly in accordance with claim 13 further comprising:

a peripheral sealing element extending around the movable valve element with the sealing element engaging the first shoulder to form the fluid tight seal between the first shoulder and the movable valve element when the valve mechanism is positioned in the closed position.

15. An assembly in accordance with claim 14 wherein the movable valve element comprises:

a head portion connected to a blade portion with the peripheral sealing element engaging the head portion and the blade portion slidably engaging the tubular passage to support the movable valve element for axial movement within the tubular passage between the open and closed positions.

16. An assembly in accordance with claim 15 wherein the head portion comprises:

outwardly projecting sections; and wherein the tubular passage further includes a second shoulder, facing the first shoulder, with the second shoulder forming a stop for the movable valve element in the open position.

17. An assembly in accordance with claim 12 further comprising:

a dispensing nozzle connected to one end of the assembly and a coaxial hose assembly coupled to another end of the assembly, the coaxial hose assembly having an inner hose connected to the vapor return passage and an outer hose connected to the fuel passage.

18. An assembly in accordance with claim 13 further comprising:

a dispensing nozzle connected to one end of the assembly and a coaxial hose assembly coupled to another end of the assembly, the coaxial hose assembly having an inner hose connected to the vapor return passage and an outer hose connected to the fuel passage.

19. An assembly in accordance with claim 14 further comprising:

a dispensing nozzle connected to one end of the assembly and a coaxial hose assembly coupled to another end of the assembly, the coaxial hose assembly having an inner hose connected to the vapor return passage and an outer hose connected to the fuel passage.

20. An assembly in accordance with claim 15 further comprising:

a dispensing nozzle connected to one end of the assembly and a coaxial hose assembly coupled to another end of the assembly, the coaxial hose assembly having an inner hose connected to the vapor return passage and an outer hose connected to the fuel passage.

21. An assembly in accordance with claim 16 further comprising:

a dispensing nozzle connected to one end of the assembly and a coaxial hose assembly coupled to another end of the assembly, the coaxial hose assembly having an inner hose connected to the vapor return passage and an outer hose connected to the fuel passage.

22. An assembly in accordance with claim 12 further comprising:

means for urging the valve mechanism to the open position.

23. An assembly in accordance with claim 22 wherein:

the means for urging the valve mechanism to the open position comprises a spring.

24. A valve assembly for preventing leaking of liquid fuel from a fuel supply passage of a coaxial hose assembly into and along a vapor return passage of the coaxial hose assembly and out of a dispensing nozzle connected to the coaxial hose assembly while the valve assembly is mounted in line with the vapor return passage and the coaxial hose assembly and the dispensing nozzle are assembled as a unit, the valve assembly comprising:

a tubular housing having a passage extending from one end to another end thereof; and means, disposed in the tubular housing, for permitting vapor to flow in a first direction through the passage and in response to the leaking fuel blocking the flow of liquid fuel leaking into the passage in a second direction of fuel flow through the coaxial hose assembly with the second direction being opposite the first direction.

25. A valve assembly in accordance with claim 24 wherein the means for permitting vapor to flow in a first direction through the passage and for blocking the flow of liquid fuel leaking into the passage in a second direction of fuel flow through the coaxial hose assembly comprises:

a valve mechanism having an open position and a closed position, the valve mechanism being normally in the open position in response to suction within the vapor return passage to provide for a return flow of vapor through the vapor return passage in the first direction, and being in the closed position in response to liquid fuel which leaks into the vapor return passage downstream of the valve mechanism with reference to the return flow of vapor through the vapor return passage and contacting a portion of the valve mechanism to prevent discharge of fuel from the vapor return passage in the second direction.

26. A valve assembly in accordance with claim 25 wherein the valve mechanism comprises:

a movable valve element which is positionable in the open and closed positions and movable therebetween;

a first shoulder located on an inner surface of the passage which functions as a valve seat for the movable valve element when positioned in the closed position to form a fluid tight seal between the first shoulder and the movable valve element.

27. A valve assembly in accordance with claim 26 further comprising:

a peripheral sealing element extending around the movable valve element with the sealing element engaging the first shoulder to form the fluid tight seal between the first shoulder and the movable valve element when the valve mechanism is positioned in the closed position.

28. A valve assembly in accordance with claim 27 wherein the movable valve element comprises:

a head portion connected to a blade portion with the peripheral sealing element engaging the head portion and the blade portion slidably engaging the passage to support the movable valve element for axial movement within the passage between the open and closed positions.

29. A valve assembly in accordance with claim 28 wherein the head portion comprises:

outwardly projecting sections; and wherein the passage further includes a second shoulder, facing the first shoulder, and the second shoulder forms a stop for the movable valve element in the open position.

30. A valve assembly in accordance with claim 24 further comprising:

means for urging the valve mechanism to the open position.

31. A valve assembly in accordance with claim 30 wherein:

the means for urging the valve mechanism to the open position comprises a spring.

32. A method for preventing leakage of liquid fuel, from a vapor return passage within a coaxial hose assembly having a fuel dispensing passage coaxial with the vapor return passage, in a direction opposite to a direction of vapor flow comprising:

positioning a valve mechanism within the vapor return passage, the valve mechanism having a normally open position in response to suction within the vapor return passage to provide for a return flow of vapor through the vapor return passage and having a closed position in response to the leakage of liquid fuel from the vapor return passage downstream from the valve mechanism with reference to a direction of the return flow of vapor within the vapor return passage and contact of the leakage of liquid fuel with a portion of the valve mechanism to prevent discharge of the leakage of the liquid fuel from the vapor return passage; and preventing leakage of fuel by a portion of the valve mechanism moving to the closed position in response to liquid fuel flowing from downstream in the vapor return passage into contact with the portion of the valve mechanism.

33. A method in accordance with claim 32 wherein the valve mechanism comprises:

a tubular passage to which suction is applied;

a movable valve element which is positionable in the open and closed positions and movable therebetween;

a shoulder located on an inner surface of the tubular passage which functions as a valve seat for the movable valve element when positioned in the closed position to form a fluid tight seal between the first shoulder with the movable valve element engaging the tubular passage to axially guide movement of the movable valve element within the tubular passage between the open and closed positions; and wherein the movable valve element moves to the closed position in response to the flow of liquid fuel from downstream into contact with the movable valve element.

34. A method in accordance with claim 33 wherein the valve mechanism further comprises:

a peripheral sealing element extending around the movable valve element with the sealing element engaging the shoulder to form the fluid tight seal between the shoulder and the movable valve element when the valve mechanism is positioned in the closed position; and the peripheral sealing element moves into contact and engages the shoulder to form the fluid tight seal in response to the flow of liquid fuel from downstream into contact with the movable valve element.

35. A method in accordance with claim 32 wherein:

positioning the valve mechanism in the normally open position with a force applied to the valve mechanism.

36. A method in accordance with claim 35 wherein:

the force is exerted with a spring.

37. A valve assembly for preventing leaking of liquid fuel from a fuel supply passage of a coaxial hose assembly into and along a vapor return passage of the coaxial hose assembly and out of a dispensing nozzle connected to the coaxial hose assembly while the valve assembly is mounted in line with the vapor return passage and the coaxial hose assembly and the dispensing nozzle are assembled as a unit, the valve assembly comprising:

a tubular housing having a passage extending from one end to another end thereof; and a moveable element, disposed in the tubular housing, for permitting vapor to flow in a first direction through the passage and which moves in response to the leaking fuel to block the flow of liquid fuel leaking into the passage in a second direction of fuel flow through the coaxial hose assembly with the second direction being opposite the first direction.

* * * * *